United States Patent
Callaghan et al.

(10) Patent No.: US 7,895,125 B2
(45) Date of Patent: Feb. 22, 2011

(54) METHOD, SYSTEM AND PROGRAM PRODUCTS FOR SHARING STATE INFORMATION ACROSS DOMAINS

(75) Inventors: Patrick Joseph Callaghan, Vestal, NY (US); Michael James Howland, Vestal, NY (US); Steven M. Pritko, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/867,134

(22) Filed: Oct. 4, 2007

(65) Prior Publication Data

US 2008/0027824 A1 Jan. 31, 2008

Related U.S. Application Data

(63) Continuation of application No. 09/050,841, filed on Mar. 30, 1998, now Pat. No. 7,302,402.

(51) Int. Cl.
  *G06F 21/00* (2006.01)
(52) U.S. Cl. .......................................... 705/59
(58) Field of Classification Search .................... 705/59
  See application file for complete search history.

(56) References Cited

U.S. PATENT DOCUMENTS

| | | | |
|---|---|---|---|
| 5,586,260 A | 12/1996 | Hu | |
| 5,678,041 A | 10/1997 | Baker et al. | |
| 5,745,556 A | 4/1998 | Ronen | |
| 5,796,952 A * | 8/1998 | Davis et al. | 709/224 |
| 5,875,296 A | 2/1999 | Shi et al. | |
| 5,905,736 A | 5/1999 | Ronen et al. | |
| 5,946,665 A | 8/1999 | Suzuki et al. | |

FOREIGN PATENT DOCUMENTS

WO  9809447 A2  3/1998

OTHER PUBLICATIONS

John Krick, "A Cookie for your Thoughts: Cookies Help Webmasters Harness User Habits". (Internet/Web/Online Service Information Tutorial, Computer Shopper, v 17, n 7, p. 610 (1) (Jul. 1997).
Laura Giacoppo, "www.dejanews.com-Forum: Comp.lang.java.announce" (Aug. 1997).
Randall Neil, "Cookie Managers", Dialog File 275, Access No. 02092614 (Jul. 1997).

* cited by examiner

*Primary Examiner*—Pierre E Elisca
(74) *Attorney, Agent, or Firm*—Schmeiser, Olsen & Watts; Elissa Wang

(57) ABSTRACT

State information is shared across domains. The state information is placed in one or more cookies that are shared across disjoint domains. An intermediary application is used, as one example, to enable the sharing of the state information (e.g., the cookies) across the different domains. The intermediary application is used to add state information to requests received from a client and to responses going to the client. Further, an intermediary application is used to cause a client to save state information for any range of Uniform Resource Locators (URLs), and to cause the client to send any previously stored state information to the intermediary application. Additionally, the intermediary application is used to cause state information previously saved by the client for one range of URLs to be subsequently saved by the client for one or more other range of URLs.

24 Claims, 13 Drawing Sheets

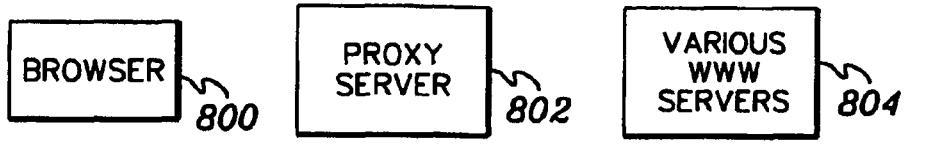

→ 830
GET http://stored.cookie.com/?set_cookie_purchases=Aptiva
&real_url=www.ibm.com/online.exe%3Fpurchase=Aptiva HTTP/1.0

← 832
HTTP/1.0 302 MOVED TEMPORARILY
Location: http://www.ibm.com/online.exe?purchase=Aptiva
Set-Cookie:www.ibm.com_purchases=Aptiva; path=/

→ 834
GET http://www.ibm.com/online.exe?purchase=Aptiva HTTP/1.0
Cookie:purchases=Aptiva; result=File1

← 836
HTTP/1.0 302 MOVED TEMPORARILY
Location: http://stored.cookie.com/?get_cookie=true
&real_url=www.ibm.com/online.exe%3Fpurchase=Aptiva
HTTP/1.0
Set-Cookie: action=checking → 838
GET http://stored.cookie.com/?get_cookie=true&real_url=
www.ibm.com/online.exe%3Fpurchase=Aptiva HTTP/1.0
Cookie: www.ibm.com_purchases=Aptiva ← 840
HTTP/1.0 302 MOVED TEMPORARILY
Location: http://www.ibm.com/online.exe?purchase=Aptiva
&set_cookie=www.ibm.com_purchases=Aptiva → 842
GET http://www.ibm.com/online.exe?purchase=Aptiva
&set_cookie=www.ibm.com_purchases=Aptiva HTTP/1.0
Cookie:purchases=Aptiva; result=File1; action=checking ← 844
HTTP/1.0 302 MOVED TEMPORARILY
Location: http://www.ibm.com/online.exe?purchase=Aptiva
Set-Cookie:www.ibm.com_purchases=Aptiva

*fig. 8b*

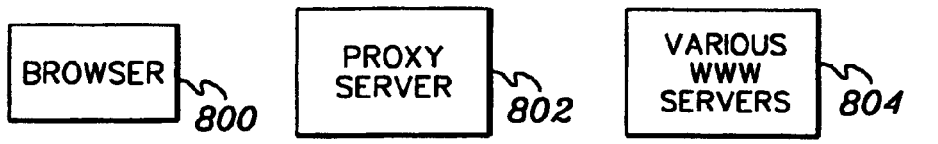

```
GET http://www.ibm.com/online.exe?purchase=Aptiva        ─850
HTTP/1.0
Cookie:purchases=Aptiva; result=File1; action=checking;
www.ibm.com_purchases=Aptiva
                                                          ─852
HTTP/1.0 200 OK
Set-Cookie:action=done; expires=Thursday,
01-Jan-1970 01:00:00 GMT
Set-Cookie:result=null; expires=Thursday,
01-Jan-1970 01:00:00 GMT
     ...
     ...
                                                          ─854
GET http://www.lotus.com/online.exe?item=Notes HTTP/1.0
                                                          ─856
HTTP/1.0 302 MOVED TEMPORARILY
Location: http://stored.cookie.com/
?real_url=www.lotus.com/online.exe%3Fitem=Notes
HTTP/1.0
Set-Cookie: action=checking
                                                          ─858
GET http://stored.cookie.com/?real_url=www.lotus.com/online
.exe%3Fitem=Notes
HTTP/1.0
Cookie: www.ibm.com_purchases=Aptiva
                                                          ─860
HTTP/1.0 302 MOVED TEMPORARILY
Location: http://www.lotus.com/online.exe?item=Notes
&set_cookie=www.ibm.com_purchases=Aptiva
                                                          ─862
GET http://www.lotus.com/online.exe?item=Notes
&set_cookie=www.ibm.com_purchases=Aptiva HTTP/1.0
Cookie: action=checking
                                                          ─864
HTTP/1.0 302 MOVED TEMPORARILY
Location: http://www.lotus.com/online.exe?item=Notes
Set-Cookie: www.ibm.com_purchases=Aptiva
```

*fig. 8c*

METHOD, SYSTEM AND PROGRAM PRODUCTS FOR SHARING STATE INFORMATION ACROSS DOMAINS

CROSS REFERENCE TO RELATED APPLICATION

This is a continuation of U.S. patent application Ser. No. 09/050,841 filed by Callaghan et al. on Mar. 30, 1998.

TECHNICAL FIELD

This invention relates, in general, to the Internet, and in particular, to sharing state information across disjoint domains of the Internet.

BACKGROUND ART

Most modern applications maintain information about its user, such as what the user was doing the last time the user ran the application or what the user preferred for the configuration settings. This is extremely useful, since it allows a user to tailor the application to the user's own specific needs or working habits. The information maintained is commonly referred to as "state information". Applications that do not maintain this state information are considered "stateless".

The World Wide Web is intrinsically stateless because each request for a new Web page is processed without any knowledge of previous pages requested. This is because the HTTP protocol that defines the formats of the requests and corresponding responses does not currently define a mechanism for state information to be maintained. Because maintaining state information is extremely useful, programmers have developed a number of techniques to add state information to the World Wide Web. These include server application programming interfaces (APIs), such as NSAPI and ISAPI, and the use of cookies.

As described by Netscape, cookies are a general mechanism used by server side connections (such as CGI scripts) to both store and retrieve information on the client side of the connection. A server, when returning an HTTP object to a client, may also send a piece of state information which the client will store. Included in that state object is a description of the range of Uniform Resource Locators (URLs) for which that state is valid. Any future HTTP requests made by the client which fall in that range will include a transmittal of the current value of the state object from the client back to the server. The state object is called a cookie, for no compelling reason.

This mechanism provides a powerful tool which enables a host of new types of applications to be written for web-based environments. A common example of an application that uses cookies is a "virtual shopping mall". As a user browses through a store of an on-line shopping mall and decides to purchase certain items, those items are added to the user's "shopping cart". Specifically, a list of the chosen items is kept in the browser's cookie file (i.e., the "shopping cart"), so that all of the items can be paid for when shopping within that particular store is complete.

As stated above, cookies that have been saved by the browser will be transmitted on subsequent HTTP requests, if the URL associated with the request is in the range of URLs for which the cookie is valid. The range of URLs for which the cookie is valid depends on what has been specified, by the server side of the connection, for the "domain" and "path" attributes associated with the cookie. Netscape defines these attributes as follows:

domain=DOMAIN_NAME
  When searching the cookie list for valid cookies, a comparison of the domain attributes of the cookie is made with the Internet domain name of the host from which the URL will be fetched. If there is a tail match, then the cookie will go through path matching to see if it should be sent. "Tail matching" means that the domain attribute is matched against the tail of the fully qualified domain name of the host. A domain attribute of "acme.com" would match host names "anvil.acme.com", as well as "shipping.crate.acme.com".
  Only hosts within the specified domain can set a cookie for a domain and domains must have at least two (2) or three (3) periods in them to prevent domains of the form: ".com", ".edu", and "va.us". Any domain that falls within one of the seven special top level domains listed below only require two periods. Any other domain requires at least three. The seven special top level domains are: "COM", "EDU", "NET", "ORG", "GOV", "MIL", and "INT".
  The default value of a domain is the host name of the server which generated the cookie response.

path=PATH
  The path attribute is used to specify the subset of URLs in a domain for which the cookie is valid. If a cookie has already passed domain matching, then the pathname component of the URL is compared with the path attribute, and if there is a match, the cookie is considered valid and is sent along with the URL request. The path "/foo" would match "/foobar" and "/foo/bar.html". The path "/" is the most general path.
  If the path is not specified, it is assumed to be the same path as the document being described by the header which contains the cookie.

As an example, if a browser receives a response which contains a cookie with a domain attribute having a value of ".ibm.com" and a path attribute having a value of "/", all subsequent requests made by the browser, to URLs that have a tail of ".ibm.com", will contain the cookie. Furthermore, any subsequent requests made by that browser, to URLs that have a tail other than ".ibm.com", will not contain the cookie.

Therefore, cookies are not shared across domains. This places limitations on the use of cookies. For instance, in the virtual shopping mall example described above, the user must check out any purchases at each individual store, since there is no way to keep track of the items from one store to another. As another example, since state information is not saved across domains, users must re-input login information for each domain. A single login is not possible.

Based on the foregoing, a need exists for a capability that enables the sharing of cookies across domains. Further, a need exists for a technique that allows a single check out in a virtual shopping mall, even when purchasing items from different vendors. Further, a need exists for a single login capacity. A yet further need exists for a capability that enables an intermediary application to provide state information to a client or a server.

SUMMARY OF THE INVENTION

The shortcomings of the prior art are overcome and additional advantages are provided through the provision of a method of sharing state information. In one example, the method includes determining state information to be shared between a first domain and a second domain, and then, sharing the state information between the first domain and the second domain. The first and second domains are non-cooperating.

In one example, the state information is stored within one or more cookies. In a further example, the first domain and the second domain are disjoint domains.

In one embodiment, the state information is representative of login credentials to be used when accessing the first domain and the second domain. In a further embodiment, the state information is representative of items to be purchased in an on-line virtual shopping mall. The first domain represents a first vendor of the on-line virtual shopping mall and the second domain represents a second vendor of the on-line virtual shopping mall.

Another embodiment of the invention includes a method of providing state information. The method includes, for instance, determining state information to be provided to at least one of a client and a server, and using an intermediary application to provide the state information to at least one of the client and the server.

In one example, the state information is added to a request for the server. In another example, the state information is added to a response for the client.

In yet another example, the state information is provided to the client, and the method further includes saving the state information at the client for any specified range of Uniform Resource Locators. Additionally, in another example, the saved state information is saved for one or more other range of Uniform Resource Locators.

In a further embodiment of the invention, a method of electronic shopping is provided. A plurality of items to be purchased is selected electronically from a plurality of vendors. The plurality of vendors are represented by a plurality of web sites. The plurality of items are purchased on-line via a single check out.

In one example, the selected plurality of items are placed in a shared shopping cart. The shared shopping cart is shared between the plurality of web sites.

In another aspect of the invention, a system of sharing state information is provided. In one example, the system includes means for determining state information to be shared between a first domain and a second domain, and means for sharing the state information between the first domain and the second domain, in which the domains are non-cooperating.

Another aspect of the invention includes a system of providing state information. The system includes, for instance, means for determining state information to be provided to at least one of a client and server, and an intermediary application adapted to provide the state information to at least one of the client and the server.

In yet another aspect of the present invention, a system of electronic shopping is provided. The system includes means for selecting a plurality of items to be purchased electronically from a plurality of vendors, wherein the plurality of vendors are represented by a plurality of web sites, and means for purchasing the plurality of items on-line via a single check out.

In another aspect of the present invention, an article of manufacture including at least one computer useable medium having computer readable program code means embodied therein for causing the sharing of state information is provided. The computer readable program code means in the article of manufacture includes, for instance, computer readable program code means for causing a computer to determine state information to be shared between a first domain and a second domain, and computer readable program code means for causing a computer to share the state information between the first domain and the second domain, wherein the domains are non-cooperating.

Another aspect of the present invention includes an article of manufacture including at least one computer useable medium having computer readable program code means embodied therein for causing the providing of state information. The computer readable program code means in the article of manufacture includes, for instance, computer readable program code means for causing a computer to determine state information to be provided to at least one of a client and a server, and computer readable program code means for causing a computer to use an intermediary application to provide the state information to at least one of the client and a server.

In another aspect of the present invention, at least one program storage device readable by a machine, tangibly embodying at least one program of instructions executable by the machine to perform a method of electronic shopping is provided. The method includes, for instance, selecting a plurality of items to be purchased electronically from a plurality of vendors, wherein the plurality of vendors are represented by a plurality of web sites, and purchasing the plurality of items on-line via a single check out.

The present invention advantageously enables the sharing of state information across disjoint domains. This is useful in many contexts. One such context is a single login facility. Another such context is a virtual shopping mall that allows a user to check out only once, even though items may have been selected from various vendors within the virtual shopping mall.

In addition to the above, the present invention enables an intermediary application to provide state information to a client and/or one or more servers.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIGS. 8a-8d depict one example of how to use the cross-domain sharing capability of the present invention to shop in a "virtual mall" and to have a single check out.

BEST MODE FOR CARRYING OUT THE INVENTION

In accordance with the principles of the present invention, a cross-domain sharing capability is provided in which state information is shared across domains, which are non-cooperating. That is, the domains have no knowledge of one another and do not directly communicate state information between one another. In one embodiment, state information associated with one or more domains is stored in at least one cookie, and that at least one cookie is then forwarded to one or more other domains. As used herein, state information includes any information that is saved for later use.

Figure 1:
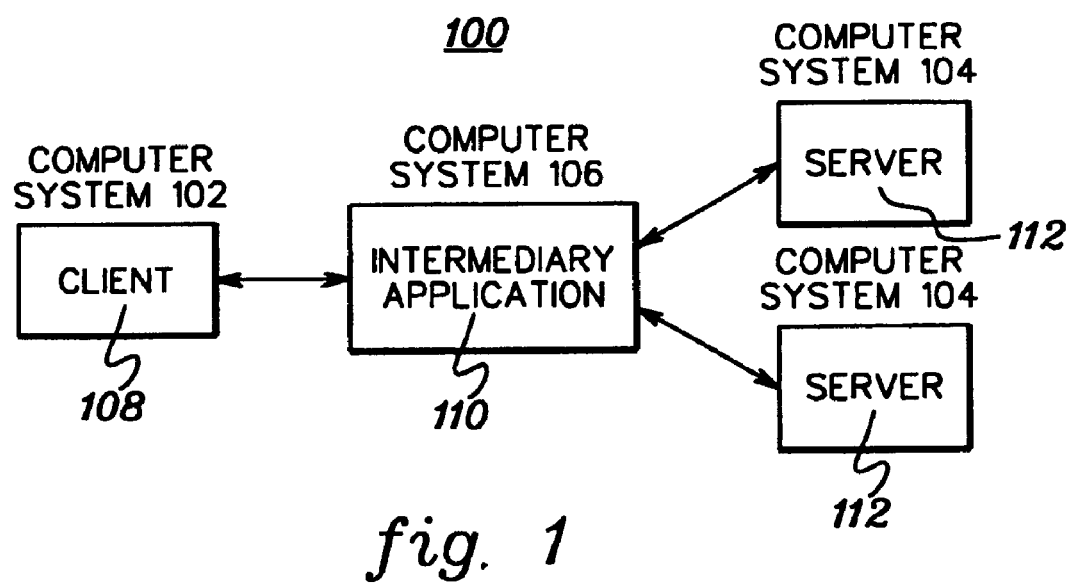
FIG. 1 depicts one example of a computing environment incorporating and using the cross-domain sharing capability of the present invention.

In one embodiment, the cross-domain sharing capability of the present invention is incorporated and used in a computing environment, such as the one depicted in FIG. 1. Computing environment 100 includes, for instance, a computer system 102 coupled to one or more other computer systems 104 via a computer system 106. Each of the computer systems can include, for example, a personal computer, a work station, a laptop computer or any other type of computer or system that supports the Internet or the World Wide Web. Computer system 106 includes a central processing unit (CPU) 107.

In one embodiment, each computer system is running a Windows 95 operating system offered by Microsoft. However, this is only one example. Other examples include, but are not limited to, the OS/2 Operating System offered by International Business Machines Corporation, MacIntosh, various other Windows operating systems and UNIX operating systems.

Computer system 102 includes, for example, a client application 108, such as a World Wide Web (WWW) browser. Client 108 is coupled to an intermediary application 110 (e.g., a proxy server) on computer system 106 via, for instance, the hypertext transfer protocol (HTTP). Intermediary application 110 is further coupled, via HTTP, to server applications 112, such as World Wide Web servers, on computer systems 104. In one example, the intermediary application has the attributes of being implemented in hardware or software, and being between a client and a server. The role of intermediary application 110 is described in detail further below.

The computing environment described above is only one example. The capabilities of the present invention can be used within other computing environments or with other computer systems without departing from the spirit of the present invention.

In accordance with the principles of the present invention, intermediary application 110 receives HTTP requests from the client and returns HTTP responses to the client. The intermediary application also sends HTTP requests to a server (such as one or more of servers 112) and in turn receives HTTP responses. The HTTP requests sent to the server and the HTTP responses returned to the client are created by the intermediary application. Thus, the intermediary application has a great deal of control over the operation of both the client and the server.

In particular, the intermediary application controls the adding of state information to the requests and responses such that the state information can be shared between different domains. The manner in which this is accomplished is described in detail with reference to FIGS. 2-8d. Specifically, FIGS. 2-6b describe the building blocks used by the intermediary application in accomplishing cross-domain sharing of state information, and FIGS. 7-8d depict two examples of how the cross-domain sharing capability of the present invention is used. In the examples described herein, browser is used as one example of a client, proxy server is used as one example of an intermediary application and WWW server is used as one example of a server. These are just examples, however; and the invention is not limited to such examples.

One of the building blocks of the proxy server includes having the proxy server add state information that it has for one domain (e.g., lotus.com) to a request, received from a browser, for a server within another domain (e.g., ibm.com). From the perspective of the server receiving the request, it will look as if the state information came from the browser, even though the receiving server is within a disjoint domain from the domain that provided the state information. One example of how this is accomplished is described below with reference to FIG. 2.

Figure 2:
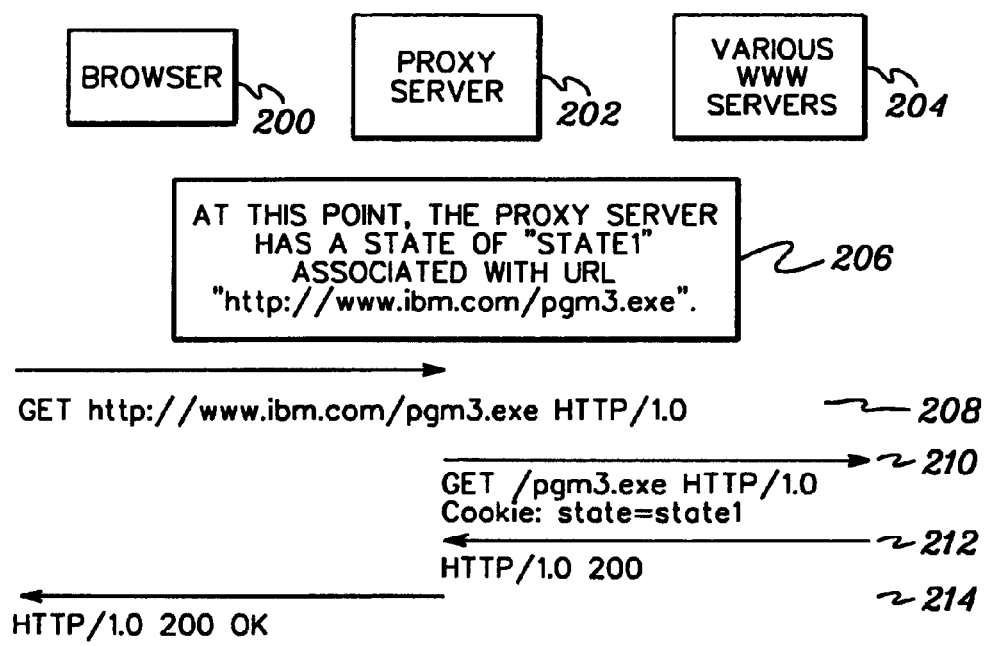
FIG. 2 depicts one example of how a proxy server can add cookies to a request going to a Web server, in accordance with the principles of the present invention.

Depicted in FIG. 2 is a browser 200, a proxy server 202 and various WWW servers 204 (also just referred to as servers herein). The arrows indicate where a particular request originated and where it was received. In this particular example, at reference 206, it is shown that proxy server 202 has previously received a state of "state1", which is associated with URL "http//www.ibm.com/pgm3.exe". This state information was provided by a server in a domain other than that which includes www.ibm.com, such as, for example, www.lotus.com, or it was generated by the proxy server itself.

Continuing with the example, browser 200 sends a request 208 to server www.ibm.com via a GET command using URL http://www.ibm.com/pgm3.exe. The GET command and the format of the URL are based on conventional standards, which are known in the art. As one example, URLs are described in detail in *The World Wide Web Complete Reference*, by Rick Stout, McGraw-Hill, Inc., 1996, which is hereby incorporated herein by reference in its entirety.

Although the request is ultimately for server "www.ibm.com", the request is received by proxy server 202, as shown in FIG. 2 (i.e., the arrow at 208 stops at the proxy server). At the proxy server, a determination is made as to whether there is state information associated with this particular URL, "http://www.ibm.com/pgm3.exe". In order to make this determination, the proxy server uses a state table maintained by the proxy server. The state table includes the URL (e.g., http//www.ibm.com/pgm3.exe), or at least a part of it, and the state (e.g., state 1). When the proxy server receives a request, it searches the state table to determine if the URL of the request matches a URL within the state table. If such a match exists, as in this example, then there is state information associated with that URL.

Thus, proxy server 202 adds the state information to request 210, which is to be forwarded to the specified server. Specifically, the state information is added to the request as a cookie. For example, it is added by the following statement: Cookie:state=state1.

The request with the state information is then forwarded from the proxy server to the server www.ibm.com. The server then responds to the request by sending response 212, which is received by the proxy server. Thereafter, the proxy server sends the response onto the browser via response 214.

In the above description, the proxy server adds state information, via a cookie, to a request from a browser to a Web server. In the following description, instead of adding the state information to the request, the proxy server adds the state information, via a cookie, to a response going to the browser. This technique is described in detail with reference to FIG. 3.

Figure 3:
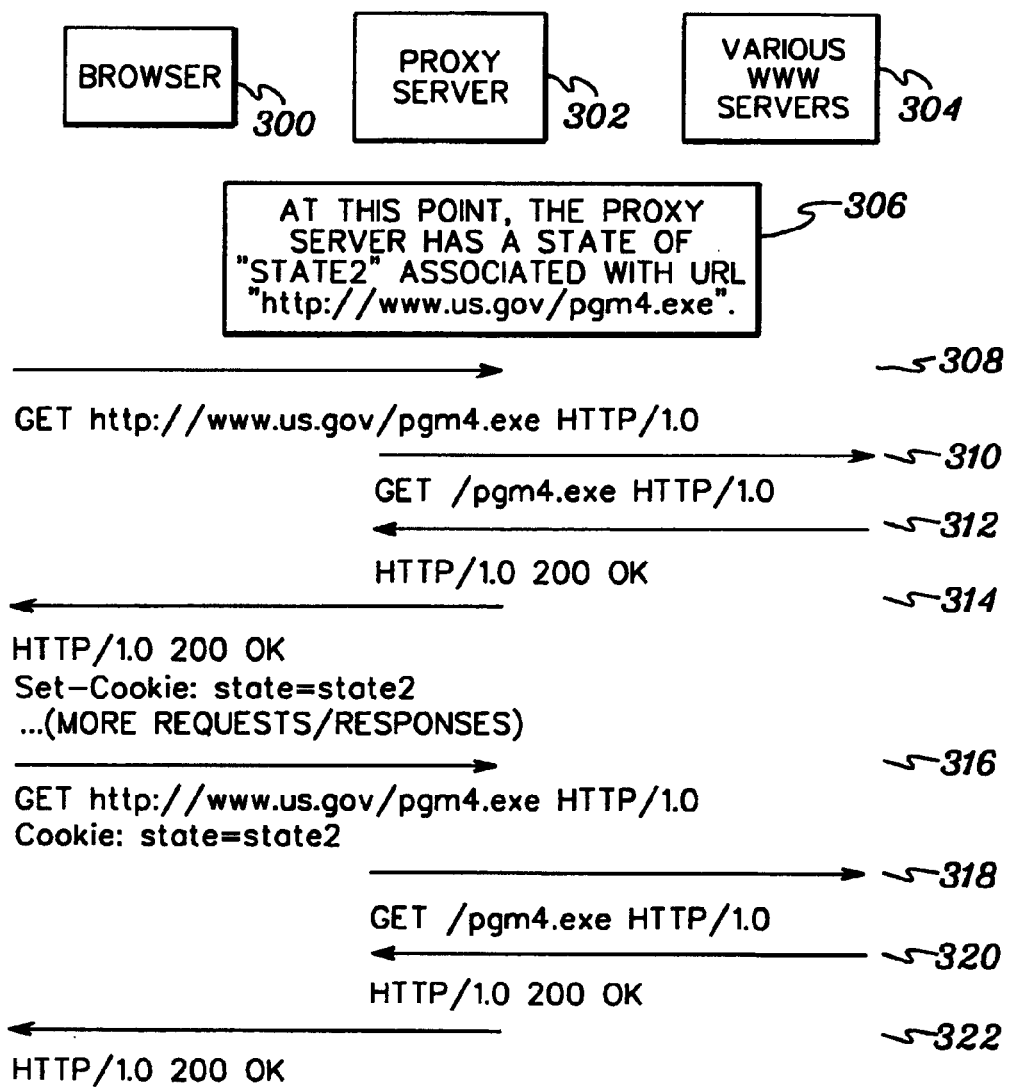
FIG. 3 depicts one example of how a proxy server can store cookies at a client, in accordance with the principles of the present invention.

Similar to FIG. 2, FIG. 3 includes a browser 300, a proxy server 302 and various WWW servers 304. In this particular example, at 306, the proxy server has a state of "state2" associated with URL "http://www.us.gov/pgm4.exe". This state information was provided by a domain other than that which includes the server www.us.gov, or it was generated by the proxy server itself.

Browser 300 sends request 308, which is for server "www.us.gov", to proxy server 302. The proxy server then sends the request (via 310) onto the appropriate server (i.e., www.us.gov), and that server forwards a response 312 back to the proxy server. Thereafter, the proxy server forwards response 314 onto the browser, instructing the browser to save the state information described at 306.

In particular, the proxy server sends the following tag to the browser: Set-Cookie:state=state2. The Set-Cookie tag instructs the browser to save the state information associated with that tag (e.g., state2) until the browser session ends, and to send it along with future requests within the range of URL's associated with the cookie. Since there was no domain or path attribute specified on the Set-Cookie tag in response 314, the only URL associated with the cookie is http://www.us.gov/pgm4.exe, as designated in 308.

Subsequently, the browser sends another request 316. The URL of that request matches the URL associated with the cookie, and thus, the state information is sent along with the request. In particular, Cookie:state=state2 is forwarded along with the request to the proxy server.

In this example, when the proxy server receives the request, it strips the state information off of the request, and then, forwards request 318 to the proper server. The server sends response 320 to the proxy server, which is then forwarded from the proxy server to the browser (322).

Described above are techniques for enabling a proxy server to pass state information onto any request that it sends to the various WWW servers, and to return state information on any response sent back to the browser. These techniques although valuable, have a couple of restrictions. First, the cookie(s) returned on HTTP responses to the browser can be associated with a range of URLs only as wide as all URLs that have a tail that matches the tail of the URL associated with the HTTP response. For example, the cookie in response 314 can only be associated with URLs that have a tail of ".us.gov" (although, in this example, there is a further specification that the entire URL match, since no domain or path were specified in the tag). Second, the cookie(s) added to each HTTP request sent to a WWW server, will only be sent to the WWW server that is the target of the request and not other WWW servers.

In order to eliminate the above restrictions, the cross-domain sharing capability of the present invention includes further techniques. For example, a technique is provided, in accordance with the principles of the present invention, in which the proxy server causes the browser to save state information for any range of URLs. That is, the browser can save state information that has not been associated by the proxy server with any specific URL or any range of URLs. One example of such a technique is described below with reference to FIG. 4.

Figure 4:
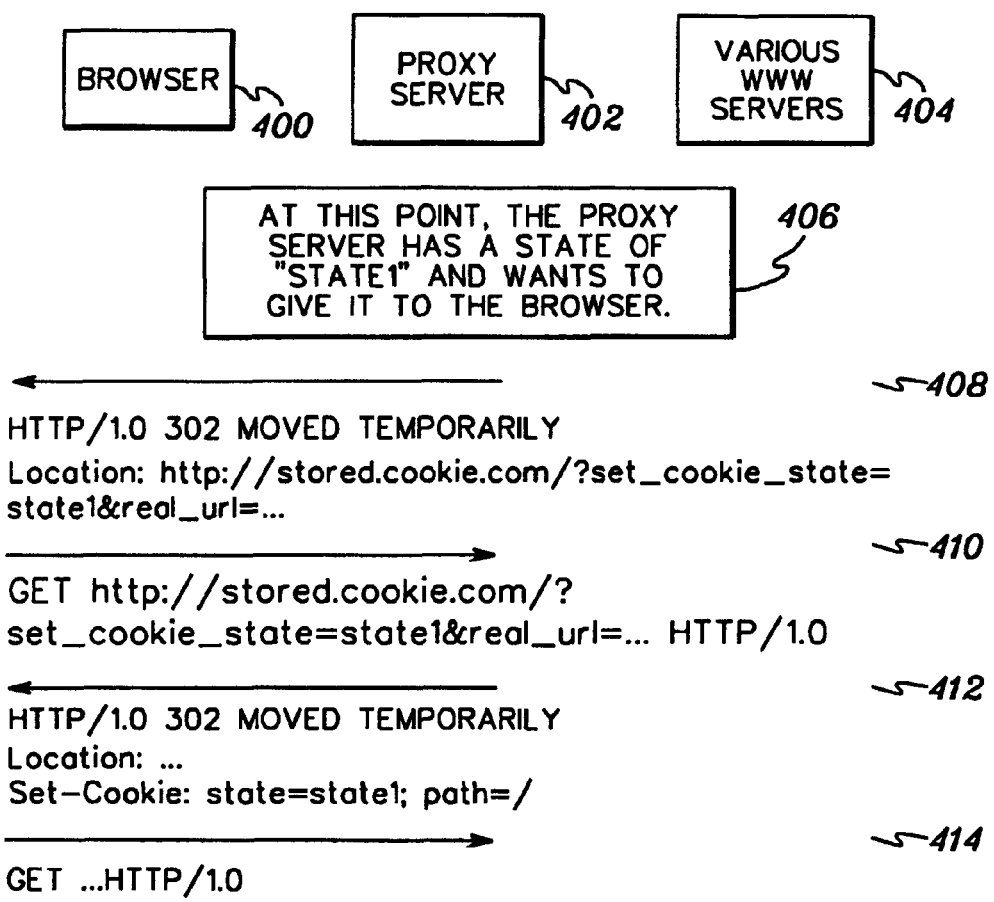
FIG. 4 depicts one example of how a proxy server can cause a browser to save one or more cookies for any range of Uniform Resource Locators (URLs), in accordance with the principles of the present invention.
Figure 5:
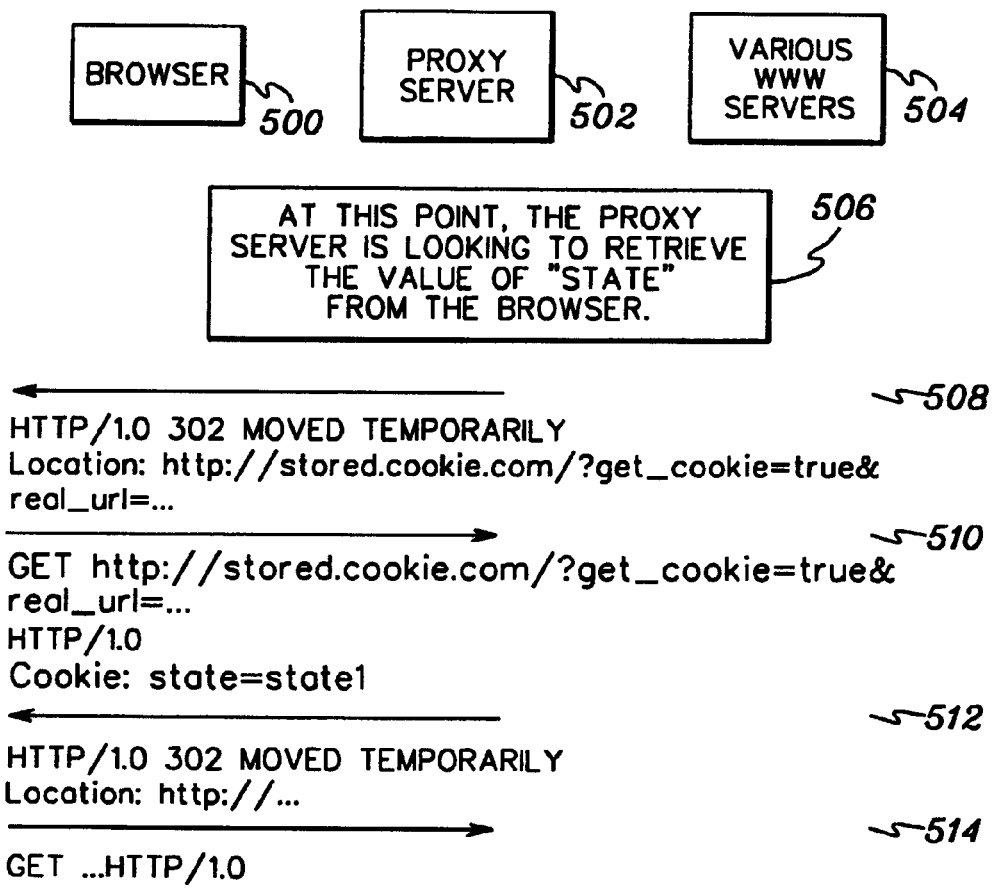
FIG. 5 depicts one embodiment of how a proxy server can, upon receiving an HTTP request from a browser, cause the browser to send any cookie previously saved for any range of URLs, in accordance with the principles of the present invention.

FIG. 4 includes a browser 400, a proxy server 402, and various WWW servers 404. Proxy server 402 has a state of "state1" that it wishes to give to browser 400 (406). The proxy server has not associated the state with any particular URL or range of URLs. In order for the proxy server to give the state information to the browser, the proxy server must somehow provide the browser with this information in a response going to the browser. Thus, response 408 is being sent to the browser for a request that was previously made by the browser, but not shown in the figure.

At 408, the proxy server sends a response to the browser, which includes a response code of 302 Moved Temporarily (also referred to as a temporary redirection response code). The response code of 302 indicates to the browser that the URL that it previously requested has temporarily moved to the location specified in "Location: . . . ". In the example of FIG. 4, the new location is "http://stored.cookie.com/?set cookie_state=state1&real_url= . . . ". The previously requested URL is saved in the "real_url= . . . " parameter of the "Location:" mime data.

The Moved Temporarily response code causes the browser to reissue request 410 for the new location. The proxy server receives the new request and determines by the "set_cookie_" parameter of the URL that this request is one for which cookies should be returned. It also determines that the request needs to be redirected to the URL specified by the "real_url= . . . " parameter.

Thus, the proxy server sends another 302 Moved Temporarily response 412 to the browser. This response includes, in the "Location: . . . " mime data, the URL of the original request, as specified by real_url (not shown). It also associates the cookie "state=state1" with the domain "stored.cookie.com", which is the host name of the server specified in request 410. Thereafter, the original request 414 is resubmitted.

By using the above technique, the proxy server can set a cookie for a fixed location, e.g., stored.cookie.com. The domain stored.cookie.com is thus, associated with state1.

In addition to the above, the proxy server can cause the browser to send any state information previously saved for any range of URLs. That is, at any point, the proxy server can retrieve a cookie from a fixed location of the browser. One example of this technique is described in detail with reference to FIG. 5.

At 506, proxy server 502 wishes to see what was previously saved at the fixed location, stored.cookie.com. Thus, in response to a previous request sent by the browser (not shown), the proxy server sends a 302 Moved Temporarily response 508 to browser 500 requesting that the browser issue a request for a URL that has "stored.cookie.com" as the host name. This 302 response includes the Location mime data used to specify this URL. It also includes the "real_url= . . . " parameter used to save the URL of the original request.

When browser 500 receives the Moved Temporarily response code, it forwards request 510 to the proxy server for the URL that has "stored.cookie.com" as the host name. Along with this request, the browser sends the associated cookie, Cookie:state=state1. Thus, when the proxy server receives the request and sees the "get_cookie_" token, it realizes that it should check for the presence of cookies. When the proxy server checks, it learns that the value of state is state1.

Thereafter, the proxy server sends another 302 Moved Temporarily response code in response 512 to browser 500 instructing the browser to resend its original request, which is specified in the "real_url" parameter. Thus, the browser resends the original request in request 514.

In addition to the above techniques, the present invention provides for a technique in which the proxy server can cause state information previously saved by the browser for one range of URLs (e.g., "http://stored.cookie.com/") to be subsequently saved by the browser for one or more other range of URLs (e.g., a URL with a tail of ".ibm.com" or ".us.gov"). This technique uses a combination of the designs described above with reference to FIGS. 4 and 5. One example of this technique is described below with reference to FIGS. 6a-6b.

Figure 6A:
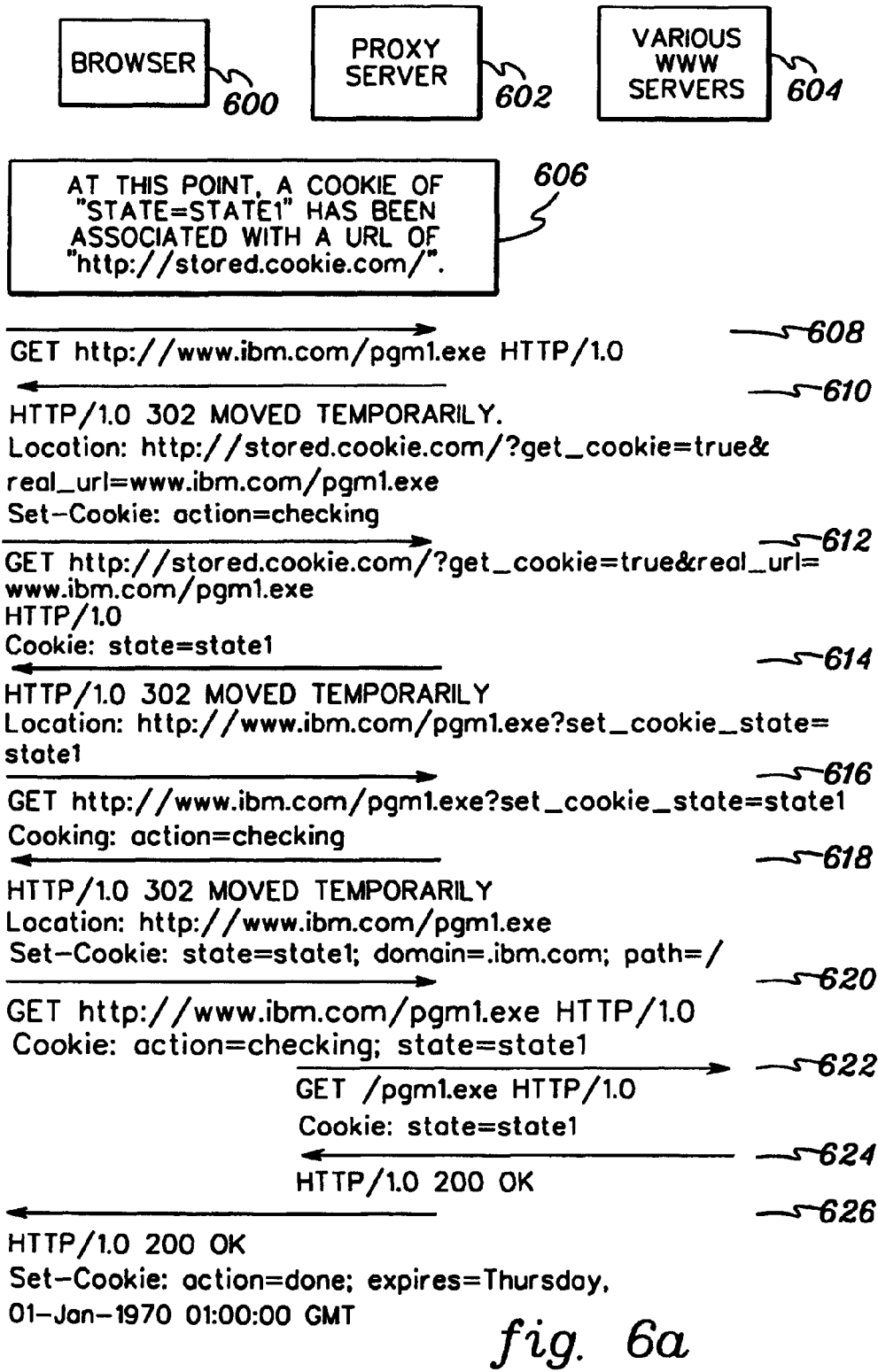
FIGS. 6a-6b depict one example of how a proxy server can be designed to cause one or more cookies previously saved by a browser for one range of URLs to be subsequently saved by the browser for one or more other range of URLs, in accordance with the principles of the present invention.
Figure 6B:

As in the other figures, each of FIGS. 6a-6b includes a browser 600, a proxy server 602 and various WWW servers 604. At 606 of FIG. 6a, a cookie of "state=state1" has already been associated with a URL of "http://stored.cookie.com/".

Browser 600 sends a request 608 to proxy server 602, which specifies a URL that has a host name of www.ibm.com. In response to request 608, proxy server 602 sends response 610 to the browser. Response 610 includes a 302 Moved Temporarily response code requesting the browser to resubmit the request for a new location, which has a host name of "stored.cookie.com". (Response 610 is similar to response 508 of FIG. 5, which is described above.)

Thereafter, the browser resubmits the request at 612 and presents the state information that is associated with the URL having a host name of stored.cookie.com. In particular, Cookie:state=state1 is forwarded to the proxy server. (Request 612 is similar to request 510 (FIG. 5), described above.)

Next, the proxy server sends another 302 response 614 to the browser instructing the browser to resubmit a request with a URL that is an extension of that contained in the original request. The 302 response is used so that the proxy server will have an opportunity, in the response to the new request, to forward cookies to the browser, as described below.

After receiving the response from the proxy server, the browser forwards new request 616 to the proxy server. This new request includes a "set_cookie_" token that indicates to the proxy server that this is a URL for which a cookie should be returned. In this example, Cookie:action=checking is also present, but is ignored, since the "set_cookie_" token is present in the URL associated with the request.

Once again, at 618, the proxy server responds with a 302 Moved Temporarily response code instructing the browser to resubmit the original request and to associate the cookie in Set-Cookie:state=state1 with ".ibm.com/".

Thus, the browser forwards request 620 to the proxy server. In this example, the request includes Cookie: action=checking, which is used to inform the proxy server that the redirection to URL "http://stored.cookie.com/?get_cookie=true&real_url=..." has already been performed (i.e., via response 610). Therefore, the proxy server is to forward the request to the appropriate WWW server.

The proxy server sends request 622 to the www.ibm.com server, after stripping off the action=checking cookie. The request includes the Cookie:state=state1 that has now been associated with the ibm.com domain, as described above.

The www.ibm.com server sends response 624 to the proxy server, and the proxy server forwards that response onto the browser at 626. Additionally, the proxy server clears the "action=" cookie by using an expires attribute with a date in the past (e.g., January 1970).

In the above example, the state=state 1 information that was previously saved by the browser for the "http://stored.cookie.com/" URL has subsequently been saved for another range of URLs specifically URLs with a tail of ibm.com. In the above example, requests and responses 614 through 620 are similar to requests and responses 408 through 414 of FIG. 4, which are described in detail above.

FIG. 6b is similar to FIG. 6a except that the cookie associated with "http://stored.cookie.com/" is stored for all URLs with a tail of ".us.gov", instead of all URLs with a tail of ".ibm.com". In particular, requests and responses 630 through 648 are similar to requests and responses 608 through 626 of FIG. 6a.

Described above are various techniques used by a proxy server to enable the sharing of state information, and in particular, the sharing of cookies across disjoint domains. One specific example of how the cross-domain sharing capability of the present invention is used is described in detail below with reference to FIGS. 7a-7b. These figures depict an example of using the present invention to solve a single login problem. The problem solved is how to send a single set of credentials (including a userid and password pair, for example) to multiple WWW servers without prompting the user to specify the credentials for each different WWW server.

Figure 7A:
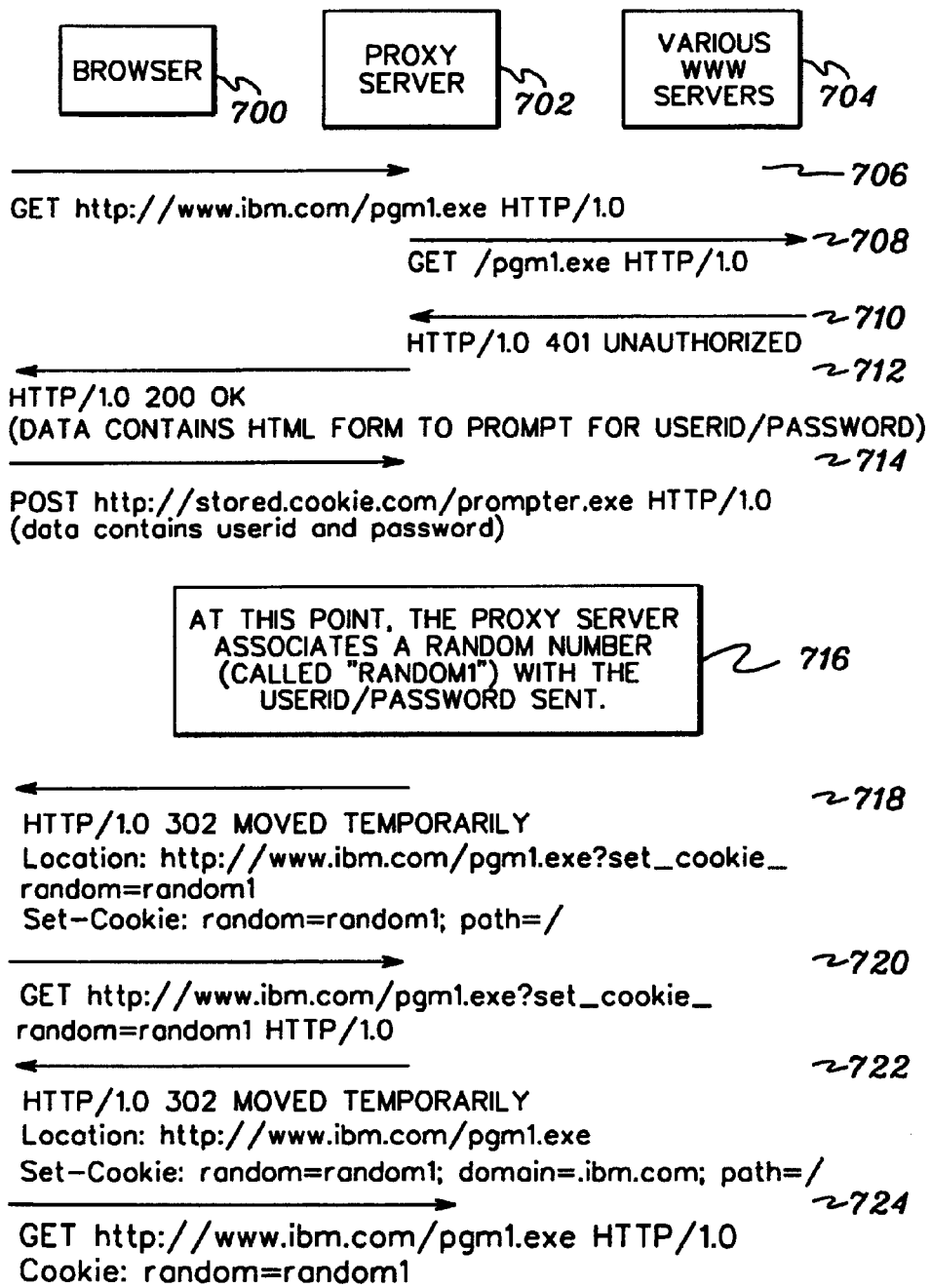
FIGS. 7a-7b depict one example of how to use the cross-domain sharing capability of the present invention to solve a single logon problem.
Figure 7B:
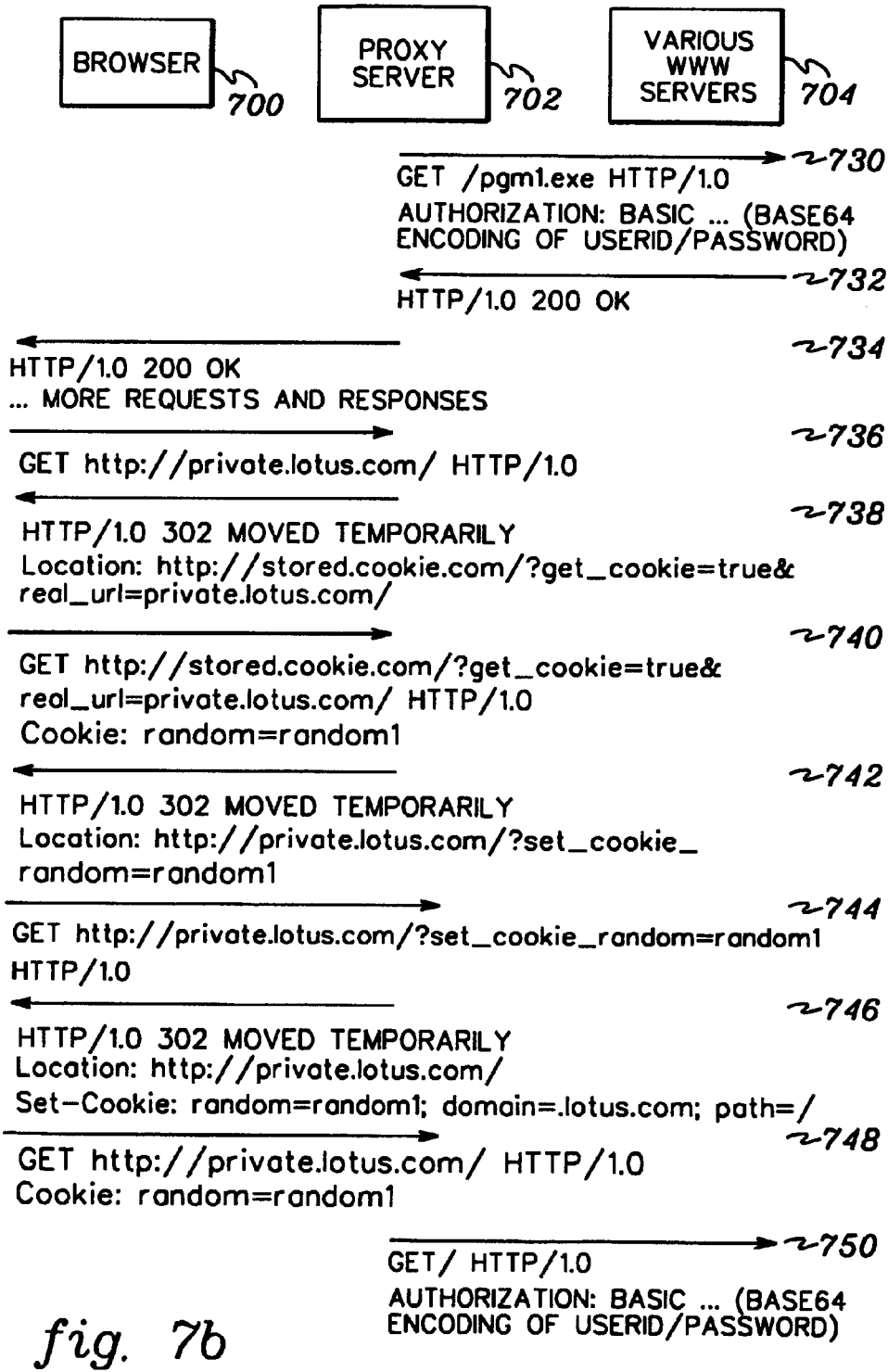
Figure 8A:
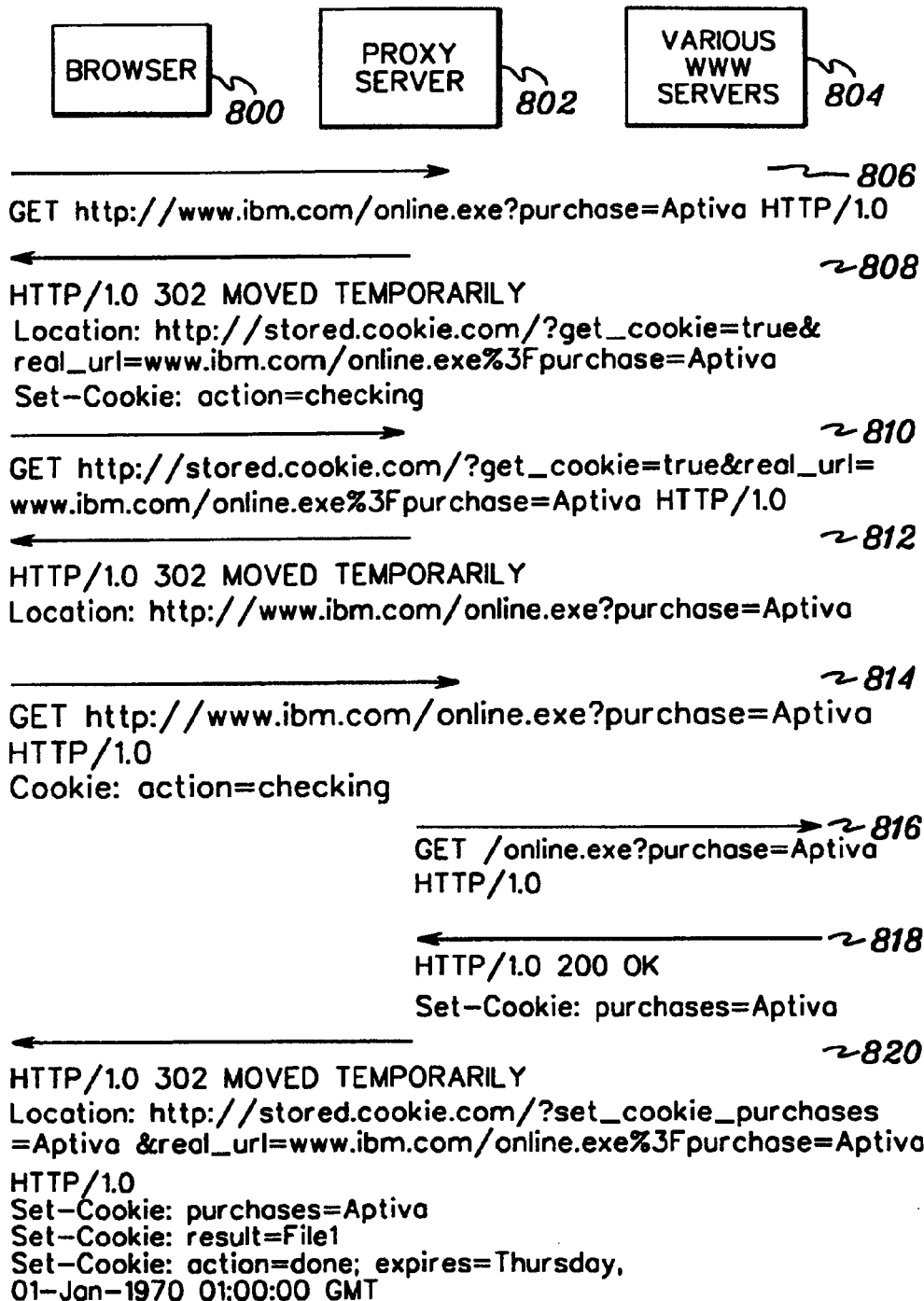
Figure 8D:
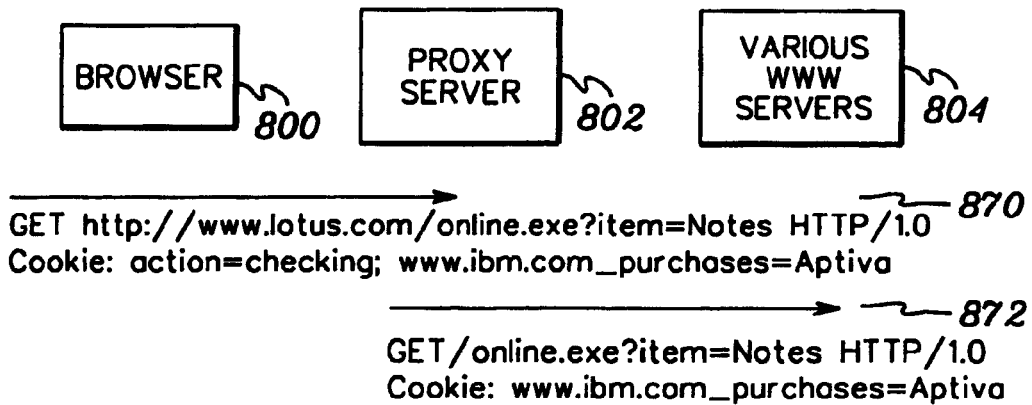

Referring to FIG. 7a, request 706 is sent by browser 700 for URL "http://www.ibm.com/pgm1.exe". Since there have been no credentials associated with this URL yet, none are sent in the request header. Proxy server 702 forwards the request to the appropriate WWW server 704, as shown in 708.

The WWW server receives the request and returns response 710, which contains a 401 unauthorized response code, since no credentials were supplied in the request header. The proxy server receives this response and converts it to a response with a response code of 200 and data that represents an HTML page, which contains an HTML Form element with fields for the user to supply its single login userid and password.

As a result of the user submitting the form, the browser sends POST request 714 containing the userid and password. Request 714 also includes host name "stored.cookie.com", which was obtained from the HTML data entered at 712. Upon receiving the request, the proxy server associates a random number, called random1 in this example (716), and sends response 718 to the browser. Response 718, as well as requests and responses 720 through 724 are similar to requests and responses 408 through 414 (FIG. 4), described above. However, in the particular example of FIG. 7a, two cookies are saved. In particular, the cookie "random=random1 is saved for both the URL "http://stored.cookie.com/" (at 718) and for all URLs with a tail of ".ibm.com" (at 722). At 724, the "random=random1" cookie is sent by the browser, since the request is associated with a URL that has a tail of ".ibm.com".

When the proxy server receives request 724, the proxy server replaces the "random=random1" cookie with the credentials (e.g., userid and password) associated at 716 with random1, and sends request 730 (FIG. 7b) to the appropriate WWW server. If the credentials are valid, the WWW server returns response 732 to the proxy server, with a response code of 200 (OK).

Thereafter, the proxy server sends response 734 to the browser. At some point in the future, but within the same session, the browser sends request 736. The cookie "random=random1" is not sent because the URL does not have a tail of ".ibm.com", instead, it has a tail of ".lotus.com". When the proxy server receives request 738, it attempts to retrieve the "random=" cookie by returning response 738 to the browser. This response contains a redirection to the URL for which the "random=" cookie should be associated, namely the URL "http://stored.cookie.com/". Requests and responses 740 through 746 are performed to associate the "random=" cookie, currently saved by the browser, with all URLs which have a tail of ".lotus.com".

As a result of the above, request 748, when sent by the browser, contains the "random=" cookie. When the proxy server receives request 748, the proxy server replaces the "random=random1" cookie with the credentials (e.g., userid and password) associated (via step 716) with random1, and sends request 750 to the appropriate WWW server. If the credentials are valid, the WWW server returns to the proxy server a response with a response code of 200 (OK) (not shown). The proxy server would then in turn forward this response to the browser.

In the above example, the "random=" cookie is saved for all URLs that have a tail of ".ibm.com" (at 722) and for all URLs that have a tail of ".lotus.com" (at 746). However, in another example, the cookie could have been saved for only the specific URLs that need authorization. This would require the proxy server to use a database listing the URLs.

Throughout the above example, the user is only prompted once for the user's credentials (at 712), even though the credentials are sent to two WWW servers with different tails, namely the server "www.ibm.com" and the server "private.lotus.com". This demonstrates a solution to the single login problem.

Another example in which the cross-domain sharing capability of the present invention is used is in a virtual on-line shopping mall. In accordance with the principles of the present invention, items from different vendors are added to a single "shopping cart", such that the purchaser only has to check out once, even though items from different vendors are being purchased. One example of using the present invention for the virtual shopping mall is described below with reference to FIGS. 8a-8d.

As with the other figures, each of FIGS. 8a-8d depicts a browser 800, a proxy server 802 and various WWW servers 804. In this example, the user has been surfing the World Wide Web, and has decided to purchase an Aptiva from IBM.

Thus, a request 806 is sent by browser 800 for URL "http://www.ibm.com/online.exe?purchase=Aptiva", which, for the purposes of this example, is the result of a user specifying that the user would like to order an Aptiva. When the proxy server receives the request, there is no "action=" cookie, and thus, the proxy server determines whether any items have been placed in the "shopping cart" that is shared between vendors. In this example, the shared "shopping cart" is any cookies saved for URL "http://stored.cookie.com/".

To determine whether any items have been placed in the shopping cart, the proxy server sends response 808 to the browser. Since request 810, which is in response to 808, does not contain any cookies, the proxy server knows that the "shopping cart" is empty. Therefore, proxy server 802 sends response 812 to redirect the browser to the URL that was originally specified in request 806.

When the proxy server receives request 814, it knows from the "action=" cookie that it does not have to check the shopping cart, and thus, it just forwards the request to the appropriate WWW server as request 816. After the server receives request 816, it sends response 818 back to the proxy server. This response contains a cookie ("purchases=Aptiva") that is to be added to the "shopping cart" for URL "http://www.ibm.com/online.exe?purchase=Aptiva".

After receiving response 818 from the WWW server, the proxy server creates a temporary file, named File1, and adds the details of response 818 to this file. The proxy server then sends response 820 to the browser.

Response 820 uses temporary redirection in order to set up the saving of the "purchases=Aptiva" cookie in the shared "shopping cart". Additionally, response 820 includes a cookie, "result=File1", that is to be stored for URL "http://www.ibm.com/online.exe?purchase=Aptiva". This cookie will eventually be used by the proxy server, as described further below. Response 820 also includes the "purchases=Aptiva" cookie so that the browser will save and associate this cookie with URL "http://www.ibm.com/online.exe?purchase=Aptiva", just as if there was no shared "shopping cart". As described above, the cookie is associated with that particular URL based on request 814. Further, response 820 instructs the browser to reissue the request with URL "stored.cookie.com/?set_cookie_purchase=Aptiva".

Thus, request 830 (FIG. 8b) is sent from the browser to the proxy server for the domain stored.cookie.com. Request 830 and response 832 are used to store into the shared "shopping cart", and to redirect the browser to the original URL (i.e., the URL of request 806). Requests and responses 834 through 838 are similar to the requests and responses 806 through 810, except this time, a cookie is stored in the shared "shopping cart". Thus, the cookie is sent in request 838.

When the proxy server receives request 838 and notices that there is a cookie in the shared "shopping cart", it sends response 840 to the browser. Response 840, request 842 and response 844 are used to save a copy of this cookie (from the shared "shopping cart") to the original URL (i.e., the URL of request 806). Note that request 842 includes both an "action=" cookie and a "set_cookie_" tag, and thus, the proxy server ignores the "action=" cookie and performs actions based on the "set_cookie_" tag, instead. In this example, the Aptiva would be in the "shopping cart" of the original URL twice, and it would be up to the WWW server to take care of the duplication. In another example, the proxy server, for instance, could make sure that the item is not added twice.

Request 850 (FIG. 8c) is used to send the original request to the proxy server. When the proxy server receives request 850, it notices that the "result=File1" cookie is present so it retrieves the contents of file "File1" and returns response 852 with the contents of this file. The proxy server then erases file "File1". Response 852 contains the "result=" cookie with a date in the past. This is used to instruct the browser to delete the "result=" cookie that has previously been saved for URL "http://www.ibm.com/online.exe?purchase=Aptiva". The same is done for the "action=" cookie.

Requests and responses 854 through 872 show what happens when the user orders Lotus Notes from the Lotus WWW server. When the proxy server receives request 854, since there is no "action=" cookie, the proxy server determines whether any items have been placed in the "shopping cart". To make this determination, the proxy server sends response 856. The subsequent request 858 sent by the browser does contain a cookie (namely, "www.ibm.com_purchases=Aptiva"), so the proxy server knows that the shared "shopping cart" is not empty.

Therefore, response 860, request 862 and response 864 are used to save a copy of this cookie (from the shared "shopping cart") to the original URL (i.e., the URL of request 854). As a result, when the browser sends request 870 (FIG. 8d), the cookies sent include the cookie saved in the shared "shopping cart" (i.e., www.ibm.com_purchases=Aptiva"). When the proxy server receives request 870, it knows that it need not check the shopping cart, since the "action=" cookie is present. Thus, the proxy server sends request 872 to the appropriate WWW server and includes the cookie saved in the shared "shopping cart". Therefore, in accordance with the principles of the present invention, the cookie in the shared "shopping cart" that was added as a result of the user purchasing an item on the "www.ibm.com" server can be presented to a server, namely "www.lotus.com", which does not have a tail of ".ibm.com".

In the above shopping mall example, whenever the user is finished making the purchases, the user can check out at the last vendor. The last vendor will be provided with all of the purchases made from any of the vendors in the shopping mall. This shopping trip can last for hours or even days.

Described in detail above are techniques used to enable the sharing of state information across disjoint domains (e.g., www.ibm.com and www.lotus.com). The state information is stored, for instance, in HTTP cookies, which are shared across the domains. In order to accomplish the sharing, a proxy server is used.

The proxy server receives HTTP requests from a browser and returns HTTP responses. The proxy server also sends HTTP requests to a WWW server and in turn receives HTTP responses. The HTTP requests sent to the WWW server and the HTTP responses returned to the browser are created by the proxy server, so the proxy server has a great deal of control over the operation of both the browser and the WWW server.

In summary, the present invention allows for cookies to be shared across disjoint domains through the use of one or more of the following techniques:

1. Since the proxy server has control of the HTTP requests sent to each WWW server, the proxy server can add it's state information, as one or more cookies, to the request headers. From the perspective of each WWW server, it will look as if the cookie had come from the browser, even though the WWW servers are within disjoint domains.

2. Since the proxy server has control of the HTTP responses sent to the browser, the proxy server can add state information, as one or more cookies, to the response headers. The browser will, for each response, save the cookie(s) for the range of URLs specified. From the perspective of the browser, it will look as if the same cookie had come from the appropriate WWW server.

3. The proxy server, upon receiving an HTTP request from the browser, can return to the browser an HTTP response that contains a response code of 302 (Moved Temporarily), one or more cookies, and a Location tag that specifies a Uniform Resource Locator (URL). Upon receiving this type of response, the browser will save the cookie(s) for the range of URLs specified and will, in response to the "Moved Temporarily" response code, send an HTTP request to the proxy server where the URL associated with the request is that specified in the Location tag of the previous response.

Upon receiving this new HTTP request from the browser, the proxy server will respond once again with an HTTP response. This HTTP response can also contain a response code of 302, along with one or more cookies in the response header. By using this technique, the proxy server can, upon receiving any HTTP request from the browser, cause the browser to save one or more cookies for any range of URLs.

4. The proxy server, upon receiving an HTTP request from the browser, can return to the browser an HTTP response that contains a response code of 302 (Moved Temporarily) and a Location tag that specifies a Uniform Resource Locator (URL). Upon receiving this type of response, the browser will, in response to the "Moved Temporarily" response code, send an HTTP request to the proxy server where the URL associated with the request is that specified in the Location tag of the previous response. If the URL associated with this new request is within the range of URLs for which cookies have been previously saved, the appropriate cookies will be sent in the request header. By using this technique, the proxy server can, upon receiving any HTTP request from the browser, cause the browser to send any cookie previously saved for any range of URLs.

By combining techniques 3 and 4 above, the proxy server can cause one or more cookies previously saved by the browser for one range of URLs to be subsequently saved by the browser for one or more other range of URLs, in accordance with the principles of the present invention.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of providing state information, said method comprising:

said intermediary server receiving from a purchaser a first selection of a first item to be purchased electronically from a first vendor having a first web server in a first domain and a second selection of a second item to be purchased electronically from a second vendor having a second web server in a second domain, said first and second domains being non-cooperating domains having no knowledge of each other and not directly communicating state information between each other but sharing state information through the intermediary server;

said intermediary server obtaining state information from the first domain and the second domain in relation to the first item and the second item; and said intermediary server enabling a single electronic check-out for the purchaser for both the first item and the second item through use of the obtained state information, such that an indication of the first item and the second item need not be moved, by the purchaser, between the first vendor and the second vendor.

2. The method of claim 1, wherein the single electronic check-out with the intermediary server avoids a need for the purchaser to electronically check-out the first item with the first vendor and separately electronically check-out the second item with the second vendor.

3. The method of claim 1, wherein the first and second selections are made by the purchaser in a same session with the intermediary server.

4. The method of claim 1, wherein the state information comprises information about preferences of the purchaser.

5. The method of claim 1, wherein the electronic check-out is an electronic shopping cart.

6. The method of claim 1, wherein the first vendor is not aware of the second selection and the second vendor is not aware of the first selection.

7. The method of claim 1, wherein said obtaining state information comprises using one or more cookies to obtain the state information from the first domain and the second domain.

8. The method of claim 1, wherein the state information is for a range of Uniform Resource Locators.

9. A computer program product, comprising a computer readable storage device storing computer readable program code which when executed by a processor of a computer system via an intermediary server causes the processor to implement a method of providing state information, said method comprising:

said intermediary server receiving from a purchaser a first selection of a first item to be purchased electronically from a first vendor having a first web server in a first domain and a second selection of a second item to be purchased electronically from a second vendor having a second web server in a second domain, said first and second domains being non-cooperating domains having no knowledge of each other and not directly communicating state information between each other but sharing state information through the intermediary server;

said intermediary server obtaining state information from the first domain and the second domain in relation to the first item and the second item; and said intermediary server enabling a single electronic check-out for the purchaser for both the first item and the second item through use of the obtained state information from the first domain and the second domain, such that an indication of the first item and the second item need not be moved, by the purchaser, between the first vendor and the second vendor.

10. The computer program product of claim 9, wherein the single electronic check-out with the intermediary server avoids a need for the purchaser to electronically check-out the first item with the first vendor and separately electronically check-out the second item with the second vendor.

11. The computer program product of claim 9, wherein the first and second selections are made by the purchaser in a same session with the intermediary server.

12. The computer program product of claim 9, wherein the state information comprises information about preferences of the purchaser.

13. The computer program product of claim 9, wherein the electronic check-out is an electronic shopping cart.

14. The computer program product of claim 9, wherein the first vendor is not aware of the second selection and the second vendor is not aware of the first selection.

15. The computer program product of claim 9, wherein said obtaining state information comprises using one or more cookies to obtain the state information from the first domain and the second domain.

16. The computer program product of claim 9, wherein the state information is for a range of Uniform Resource Locators.

17. A computer system comprising a processor and a computer readable memory device coupled to the processor, said memory device containing instructions which when executed by the processor via an intermediary server causes the processor to implement a method of providing state information, said method comprising:
said intermediary server receiving from a purchaser a first selection of a first item to be purchased electronically from a first vendor having a first web server in a first domain and a second selection of a second item to be purchased electronically from a second vendor having a second web server in a second domain, said first and second domains being non-cooperating domains having no knowledge of each other and not directly communicating state information between each other but sharing state information through the intermediary server;
said intermediary server obtaining state information from the first domain and the second domain in relation to the first item and the second item; and
said intermediary server enabling a single electronic check-out for the purchaser for both the first item and the second item through use of the obtained state information from the first domain and the second domain, such that an indication of the first item and the second item need not be moved, by the purchaser, between the first vendor and the second vendor.

18. The computer system of claim 17, wherein the single electronic check-out with the intermediary server avoids a need for the purchaser to electronically check-out the first item with the first vendor and separately electronically check-out the second item with the second vendor.

19. The computer system of claim 17, wherein the first and second selections are made by the purchaser in a same session with the intermediary server.

20. The computer system of claim 17, wherein the state information comprises information about preferences of the purchaser.

21. The computer system of claim 17, wherein the electronic check-out is an electronic shopping cart.

22. The computer system of claim 17, wherein the first vendor is not aware of the second selection and the second vendor is not aware of the first selection.

23. The computer system of claim 17, wherein said obtaining state information comprises using one or more cookies to obtain the state information from the first domain and the second domain.

24. The computer system of claim 17, wherein the state information is for a range of Uniform Resource Locators.

* * * * *